US010668975B2

(12) United States Patent
Walthert et al.

(10) Patent No.: US 10,668,975 B2
(45) Date of Patent: Jun. 2, 2020

(54) SHOCK DEVICE IN PARTICULAR FOR BICYCLES

(71) Applicant: DT SWISS INC., Grand Junction, CO (US)

(72) Inventors: Martin Walthert, Aarberg (CH); Karsten Richter, Biel (CH); Samuel Zbinden, Biel (CH)

(73) Assignee: DT SWISS INC., Grand Junction, CO (US)

(*) Notice: Subject to any disclaimer, the term of this patent is extended or adjusted under 35 U.S.C. 154(b) by 197 days.

(21) Appl. No.: 15/980,518

(22) Filed: May 15, 2018

(65) Prior Publication Data
US 2018/0334220 A1 Nov. 22, 2018

(30) Foreign Application Priority Data

May 18, 2017 (DE) .......................... 10 2017 110 889

(51) Int. Cl.
*B62K 25/08* (2006.01)
*F16F 9/44* (2006.01)
(Continued)

(52) U.S. Cl.
CPC .............. *B62K 25/08* (2013.01); *B62K 25/10* (2013.01); *B62K 25/28* (2013.01); *F16F 9/065* (2013.01);
(Continued)

(58) Field of Classification Search
CPC ........ B62K 25/08; B62K 25/10; B62K 25/28; B62K 2025/044; B62K 2025/048;
(Continued)

(56) References Cited

U.S. PATENT DOCUMENTS 6,415,895 B2 * 7/2002 Marking ............... F16F 9/0209
188/287
9,038,791 B2 * 5/2015 Marking ............... F16F 9/3235
188/314
(Continued)

FOREIGN PATENT DOCUMENTS

DE 102011002339 A1 10/2012
EP 1950449 A1 7/2008
(Continued)

OTHER PUBLICATIONS

Extended European Search Report from corresponding European Patent Application No. 18172888.2, dated Nov. 14, 2018.
(Continued)

Primary Examiner — Melanie Torres Williams
(74) Attorney, Agent, or Firm — Greer, Burns & Crain, Ltd.

(57) ABSTRACT

A shock device for an at least partially muscle-powered two-wheeled vehicle including a damping system having a damper cylinder and a moving piston disposed therein and connected with a piston rod extending from the damper cylinder, wherein the piston acts on a first damping chamber in the damper cylinder in the compression stage as the piston rod plunges in from a retracted base position into a plunged-in position. In the damping system, as the piston rod plunges in, damping fluid is transferred from the first damping chamber to an auxiliary chamber. A flow resistance for transferring the damping fluid into the auxiliary chamber is configured travel-dependent, depending on the piston position. The flow resistance for transferring the damping fluid into the auxiliary chamber over a first travel distance of the piston including the base position is smaller than over a second travel distance that is plunged in further.

22 Claims, 8 Drawing Sheets

(51) Int. Cl.
  *B62K 25/28* (2006.01)
  *B62K 25/10* (2006.01)
  *F16F 9/06* (2006.01)
  *F16F 9/34* (2006.01)
  *F16F 9/48* (2006.01)
  *F16F 9/50* (2006.01)
  *F16F 9/516* (2006.01)
  *B62K 25/04* (2006.01)

(52) U.S. Cl.
  CPC ............... *F16F 9/067* (2013.01); *F16F 9/34* (2013.01); *F16F 9/446* (2013.01); *F16F 9/48* (2013.01); *F16F 9/50* (2013.01); *F16F 9/516* (2013.01); *B62K 2025/044* (2013.01); *B62K 2025/048* (2013.01); *F16F 2228/066* (2013.01)

(58) Field of Classification Search
  CPC .... F16F 9/065; F16F 9/067; F16F 9/34; F16F 9/446; F16F 9/48; F16F 9/50; F16F 9/516; F16F 2228/066
  See application file for complete search history.

(56) References Cited

U.S. PATENT DOCUMENTS

| | | |
|---|---|---|
| 9,879,749 B2 | 1/2018 | McNab |
| 2015/0233442 A1* | 8/2015 | Noguchi .................. F16F 9/48 188/284 |

FOREIGN PATENT DOCUMENTS

| | | |
|---|---|---|
| EP | 2413001 A1 | 2/2012 |
| EP | 2479097 A2 | 7/2012 |

OTHER PUBLICATIONS

German Search Report from German Patent Application No. 10 2017 110 889.0, dated Jan. 23, 2018.

* cited by examiner

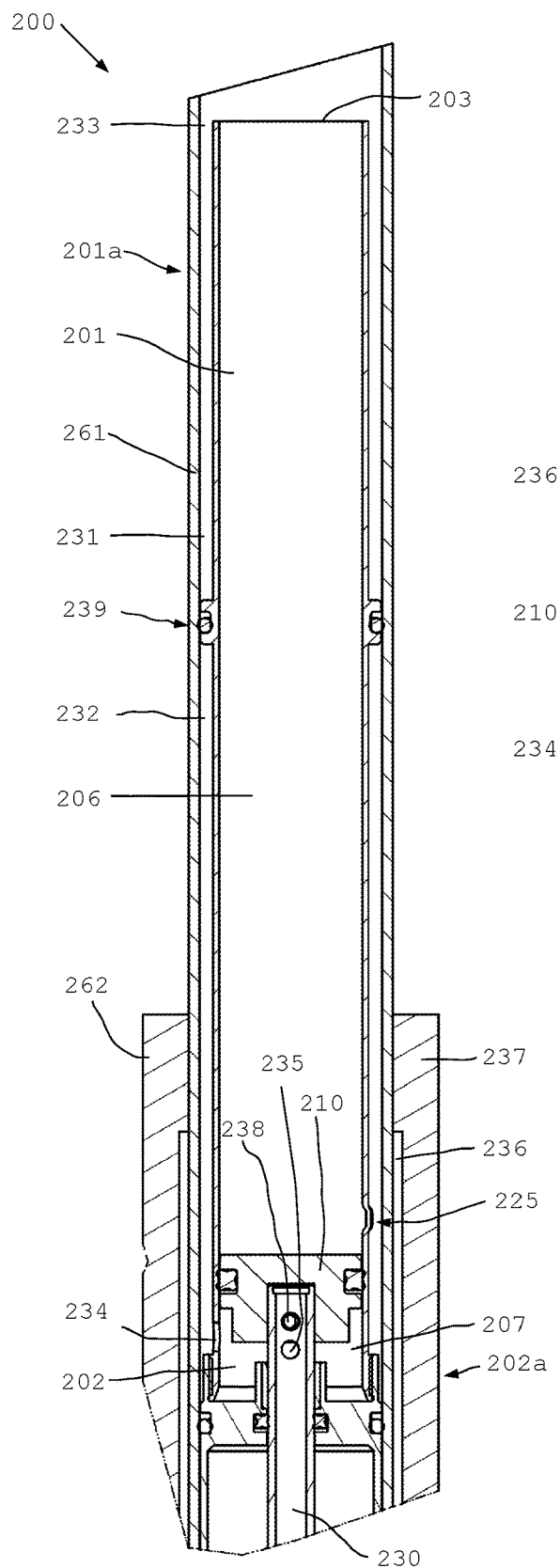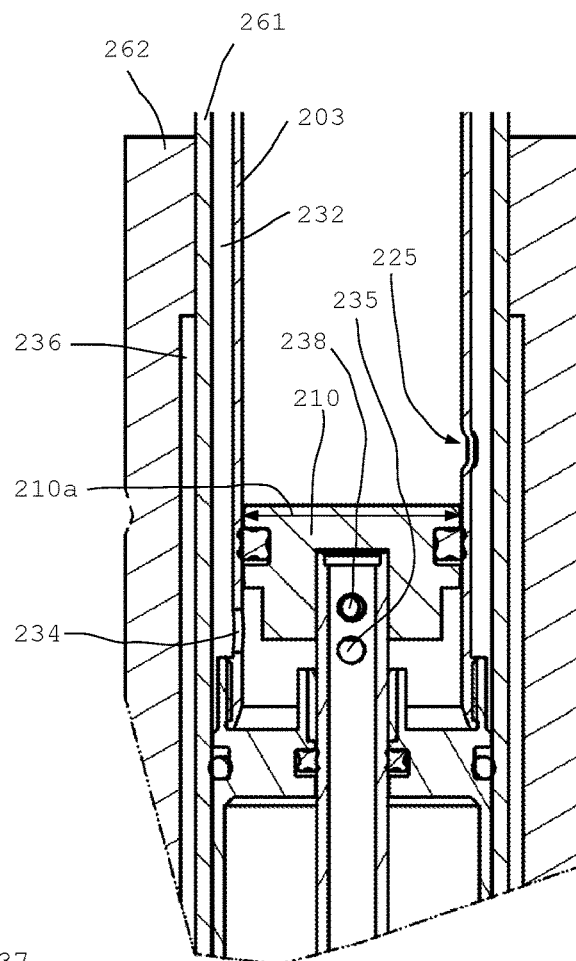
Fig. 11
Fig. 12

SHOCK DEVICE IN PARTICULAR FOR BICYCLES

BACKGROUND

The present invention relates to a shock device, and in particular a shock absorber for an at least partially muscle-powered two-wheeled vehicle, and in particular a bicycle and comprises at least one damping system having a damper cylinder and a moving piston disposed therein which is connected with a piston rod leading out of the damper cylinder. Particularly preferably, the invention relates to a suspension fork for an at least partially muscle-powered two-wheeled vehicle, and in particular a bicycle.

The prior art has disclosed a great variety of shock absorbers for bicycles with and without an electric auxiliary motor. The weight of at least partially muscle-powered bicycles plays a significant role, in particular where sports or competition bicycles are concerned. Weight reduction in bicycle components tends to involve significant work input.

Most mountainbikes come equipped with a suspension fork and a rear wheel shock absorber. The shock devices at the front and rear wheels serve to dampen shocks in downhill rides so as to increase comfort. Furthermore, the safety in riding can be increased since the bicycle wheels show improved traction.

Known suspension forks tend to be provided with a plurality of flow valves which control compression stage damping in dependence on the compressing speed. Other than control valves for low speeds, control valves for high speeds are also provided for supplying adapted and suitable damping characteristics over the entire speed range. The known rear wheel shock absorbers and suspension forks allow achievement of a wide scope of satisfactory properties.

It has been found, however, that in certain riding situations it may be difficult to obtain optimal damping characteristics in the compression stage. The center of gravity of a sitting rider during fast downhill rides is typically rather in the rearward area of the bicycle. The front wheel is thus unloaded and the suspension fork is firstly only slightly compressed. In these riding situations, it is per se desirable for the suspension fork to operate at weak compression stage damping, thus readily neutralizing small or medium-sized obstacles which the rider hardly feels in his hands and arms. This requires setting a weak compression stage damping. Now if a strong shock occurs, the available suspension travel may possibly not be very long so that a particularly hard high speed compression stage damping needs to be used. This may show the drawback that such strong damping will also be used for small shocks. Therefore, the suspension fork is less than optimally comfortable in rides involving minor obstacles.

WO 2014/190387 A1 has disclosed a shock absorber for bicycles in which a piston in a damper chamber separates two chambers filled with the damping fluid. The volume of the damping fluid displaced as the piston rod plunges in is guided to an external equalizing chamber where a dividing piston separates the working fluid from a gas chamber. In order to provide different damping strengths over the suspension travel, the damper chamber is surrounded by a cylindrical hollow space, and over the length of the damper chamber a plurality of bypass bores is provided which connect the damper chamber with the cylindrical hollow space. Thus, during compressing the damping force keeps increasing with increasing utilization of the suspension travel since the quantity of bypass connections decreases. In this way a stronger end position damping is realized as well. Although this known shock absorber is functional, it comprises a heavy steel spring and a complex structure requiring around the damper chamber a cylindrical hollow space having a plurality of bypass bores.

It is therefore the object of the present invention to provide a shock device showing a simpler structure and lighter weight for an at least partially muscle-powered two-wheeled vehicle, and in particular, a bicycle which in the case of minor shocks for example in fast downhill rides shows softer response, and which in the case of major obstacles or when hitting the ground following jumps and the like provides sufficiently long suspension travel.

SUMMARY

A shock device according to the invention for an at least partially muscle-powered two-wheeled vehicle, and in particular a bicycle comprises a damping system having a damper cylinder and a moving piston disposed therein which is connected with a piston rod leading out of the damper cylinder. The piston acts (in the compression stage) on a first damping chamber in the damper cylinder as the piston rod plunges in from a base position which is retracted further or maximally and for example a neutral position, to a position further or maximally plunged-in, and for example an end position. The damping system is configured such that as the piston rod plunges in, damping fluid is transferred from the first damping chamber to an auxiliary chamber. The entire damping fluid or alternately, just part of the damping fluid may be transferred. A flow resistance for transferring the damping fluid into the auxiliary chamber is configured travel-dependent and depends (directly or indirectly) on the piston position. The flow resistance (for transferring the damping fluid into the auxiliary chamber) is smaller in a first piston travel distance including the base position than in at least one second travel distance that is plunged-in further. A transition section is provided between the first travel distance and the second travel distance. The auxiliary chamber forms an equalizing volume for a volume of the piston rod. A dividing piston biased by a biasing device is provided at the auxiliary chamber. The position of the dividing piston is dependent on the piston position. At least one first and at least one second duct lead into the auxiliary chamber for leading damping fluid into the auxiliary chamber. The second duct is at least partially closed by the dividing piston when the piston is located in the transition section.

The base position may be an initial position, or for example, a position resulting in the unloaded state of a two-wheeled vehicle equipped with such a shock device. It is also preferred for the base position to specify the sag position which ensues as the rider mounts a stationary two-wheeled vehicle equipped therewith. Due to the dead weight and the weight of the rider, the shock devices such as the suspension fork and rear wheel shock absorber compress a certain amount, which defines the sag position. This position also represents a base or initial position as it is given at the beginning of a ride.

The shock device according to the invention has many advantages. A considerable advantage of the inventive shock device consists in that travel-dependent damping is provided wherein the flow resistance and thus the damping over a first travel distance including the base position is lower than over a second, further plunged-in travel distance. Travel-dependent damping that is lower over a first (short) distance than over the subsequent distance offers the advantage of soft damping for minor shocks in fast downhill rides, so that those shocks are not at all or only weakly transmitted to the rider's hands and arms. This makes the inventive shock device highly comfortable. If the rider hits a large obstacle, then the shock device operates over the entire suspension travel, providing a correspondingly strong compression stage damping. A simple structure is possible by providing the auxiliary chamber with a dividing piston that is biased by a biasing device and that closes the second duct at least partially. The structure is uncomplicated, allowing a low-cost, lightweight design. The damper chamber does not need to be surrounded by a cylindrical hollow space enabling a kind of bypass for flowing oil or for the damping fluid.

Preferred configurations provide for a shock device in the shape of a shock absorber. Thus, the term "shock device" may be more precisely called a "shock absorber" in the entire present application. This shock absorber may in particular be provided for the front wheel or e.g. for the rear wheel. A shock absorber for the front wheel is also referred to as a suspension fork. A shock absorber for the rear wheel may also be referred to as a rear wheel shock absorber.

Preferably the first travel distance extends over a length that is shorter than half the maximum piston stroke. The first travel distance may extend from the beginning of the piston stroke (completely extended state). Alternately, the first travel distance may begin e.g. at the base position such as the unloaded position or the sag position. This means that the first travel distance may be preceded by another, "original" travel distance. Preferably, the original travel distance and the first travel distance together terminate in front of half the maximum piston stroke. The original travel distance—if any—is preferably very short and in particular shorter than 20% or preferably 10% of the first travel distance.

The flow resistance for transferring the damping fluid into the auxiliary chamber is in particular increased at the end of the first travel distance. This means that preferably the flow resistance for transferring the damping fluid into the auxiliary chamber at half (or e.g. 40% or 60% of) the maximum piston stroke is markedly higher than in the base position.

Preferably, the flow resistance for transferring the damping fluid into the auxiliary chamber is higher over a medium travel distance between the first travel distance and an end portion than it is over the first travel distance. Additionally, it is possible to provide an end portion with a (still) stronger end position damping. If a stronger end position damping is provided then, dependent on the travel, the damping is weaker over the first travel distance than over the second travel distance and, dependent on the travel, the damping over the second travel distance in turn is weaker than over the end portion. Over a "further travel distance"—if any—in front of the first travel distance the damping may be the same as over the first travel distance or else it may be different. A stronger end position damping may be provided to establish or strengthen propagation protection.

In preferred configurations, the flow resistance over the first travel distance preferably remains substantially and in particular (virtually) unchanged. Substantially unchanged means that any flow resistance changes in dependence on the position over the first travel distance are preferably less than 10%.

In preferred specific embodiments, the flow resistance is influenced by changing the effective flow cross-section. Changing the flow cross-section allows effectively influencing the flow resistance and thus the compression stage damping.

Preferably, the first travel distance is (directly) followed by the transition section in which the flow cross-section is reduced. This will correspondingly increase the flow resistance. The flow cross-section may be reduced continuously or in stages over the length of the transition section.

The transition section is preferably shorter than 25% or 20% of the maximum piston stroke. The second travel distance in particular (directly) follows the transition section, extending over a length between 40% and 60% of the maximum piston stroke.

In all the configurations, it is preferred for the piston in the damper cylinder to variably divide the damping volume into a first damping chamber and a second damping chamber. In these configurations, it is preferred for the piston to be equipped with at least one throttle unit to allow damping fluid to pass through the piston in the compression stage and/or the rebound stage.

The auxiliary chamber forms an equalizing volume for the volume of the piston rod. A dividing piston biased by a biasing device is provided at the auxiliary chamber. The position of the dividing piston is dependent on the piston position. Particularly preferably, the position of the piston is unambiguously associated with the position of the dividing piston. This means that the piston position unambiguously defines the position of the dividing piston (and reversely).

Alternately, it is possible for the auxiliary chamber to form the second damping chamber and for the damping fluid to be transferred from the first damping chamber to the auxiliary chamber as the tube system compresses. Accordingly, the damping fluid is then transferred from the auxiliary chamber to the first damping chamber as the tube system rebounds.

At least the first duct and at least the second duct lead into the auxiliary chamber. Damping fluid can be fed into the auxiliary chamber through the first duct and the second duct.

The second duct is at least partially closed by the dividing piston when the piston is located in the transition section. Preferably, the second duct is open when the piston is located in the first travel distance. In preferred configurations, the second duct is preferably (substantially completely or completely) closed when the piston and/or the dividing piston is/are located in the second travel distance. The second duct can be closed by way of closing an (e.g. side) inlet and/or an outlet of the second duct. The second duct may remain open on one side (a front face) even when closed.

It is also possible for the dividing piston to close a cross-section portion of the first duct when the piston is located in the transition section.

Preferably, the second duct is (virtually completely or nearly completely or completely) closed when the piston is located in a second travel distance subsequent to the transition section. In the sense of the present application, a "closed duct" is understood to mean a duct that is closed far enough so that a free flow cross-section remains that is less than 30% and in particular less than 10% and preferably less than 5% of the maximum free flow cross-section. Preferably, the first travel distance and the transition section extend over less than half of the piston stroke and thus over less than half of the maximum length of travel. Particularly preferably, the second duct is closed by the dividing piston whose position depends on the position of the piston. Particularly preferably, the second duct is closed completely when the dividing piston is located in a second travel distance of the dividing piston following the transition section of the dividing piston.

In preferred configurations, the first travel distance and the transition section extend over less than 45% of the maximum piston stroke and in particular over less than 40% of the piston stroke. In advantageous configurations, the first travel distance (optionally including the transition section)

may extend over (approximately) one third of the piston stroke. This configuration causes the setting of a clearly reduced damping in the first third of the suspension travel while damping is markedly increased over the subsequent suspension travel also in the low-speed range. This provides an advantageous shock device. Thus, a shock device can provide soft damping of weak and medium shocks over the first travel distance while appropriately hard damping is provided for strong shocks in this range as well.

In preferred specific embodiments, the first duct and the second duct are flow ducts of a throttle for the compression stage and in particular for the low-speed compression stage. Thus, the first duct and the second duct preferably serve for damping weak and medium shocks.

Preferably, the flow resistance of the throttle for the compression stage and in particular for the low-speed compression stage can be set and adjusted from the outside by way of at least one operating member. This is for example done by influencing the passage resistance in at least one valve upstream of the two ducts. In this way, the flow resistance is generally increased or decreased while the travel-dependent damping characteristics are correspondingly maintained.

In preferred configurations, the transition position of the transition section is preferably adjustable. The position of the member closing the second duct may, for example be adjusted in the longitudinal direction by way of screwing or some other adjusting process for adjusting the transition position.

In preferred embodiments, the length of the transition section is also variable and/or adjustable. Such adjusting can be done for example by angular adjustment of a component. It is also possible for the length of the transition section to be adjustable by means of exchanging components.

Preferably, all the configurations provide or comprise at least one additional throttle for the high-speed compression stage. Such an additional throttle may, for example be provided by a valve that is biased to the closed position by a suitable spring so that the responding valve opens only if forces exceeding the spring force are applied.

In all the configurations, it is preferred for the dividing piston to be biased by means of a spring unit such as a steel spring and/or a gas spring. This or another spring unit allows automatic return to the unloaded state.

Preferably, a device for stronger top-out damping is provided. This device may consist of an elastic material. Alternately, an additional cross-section reduction or flow resistance increase is possible. Thus, it is in particular possible to reduce the flow cross-section at the end of the piston stroke to provide stronger end position damping. Then, the damping (for the compression stage) is reduced relative to the center region in a region at the beginning of the piston stroke and increased relative to the center region at the end.

In advantageous specific embodiments the base position corresponds to an initial position with the piston rod extended to its maximum or e.g. in the sag position or e.g. an in-between or adjacent position.

Preferably, the shock device comprises at least one tube system of a stanchion tube and a cooperating slider tube and an adjacent wheel receiving space. The damping system is disposed in the tube system.

The shock device may comprise an accommodation for a saddle device or it may be configured as a rear wheel damper. Preferably, the shock device is a shock absorber and in particular a suspension fork.

The shock device according to the invention provides travel dependence of the damping at or around the beginning of the suspension travel. The prior art has disclosed travel-dependent damping which travel-dependence of the damping is, however, only employed as a propagation protection near the end of the suspension travel. According to the invention, damping is considerably or substantially reduced in the first part of the suspension travel, for example the first third or approximately the first half (or the first 60%) of the suspension travel. In this way, the suspension fork can be operated in fast downhill traveling speeds or in fast sitting travel and with the front wheel largely unloaded, applying very weak compression stage damping in the first third or in the first 40% of suspension travel, where the suspension fork can readily compensate for small and medium-sized obstacles. This provides a comfortable ride. In slow rides in technical terrain, or at the start of braking and in landing after jumps and when hitting large obstacles, the suspension fork operates over the entire suspension travel, where strong compression stage damping is desired and provided to keep the suspension fork from sagging.

The invention avoids the drawback that fast and weak hits also cause strong damping which would provide an uncomfortable suspension fork and/or an uncomfortable rear wheel damper.

Further advantages and features of the present invention can be taken from the exemplary embodiments which will be described below with reference to the enclosed figures.

BRIEF DESCRIPTION OF THE DRAWINGS

The figures show in:

FIG. 11 a further suspension system for the suspension fork of FIG. 2; and FIG. 12 an enlarged detail of FIG. 11.

DETAILED DESCRIPTION

Figure 1:
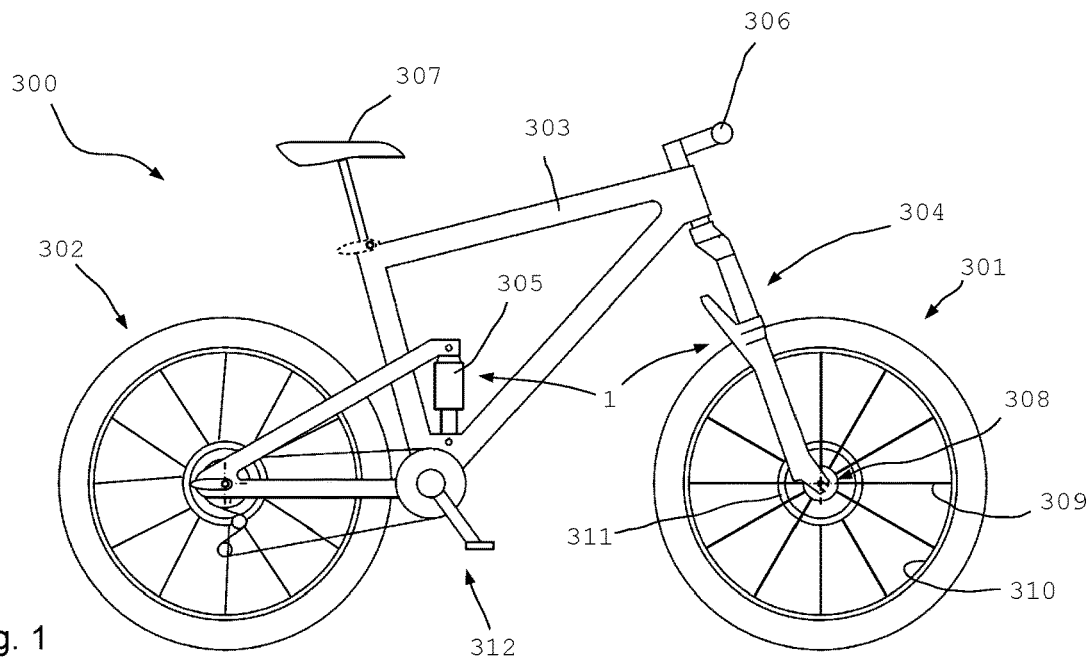
FIG. 1 a schematic side view of a mountain bike.

FIG. 1 shows a schematic illustration of a mountainbike representing the bicycle or two-wheeled vehicle 300. The bicycle may be provided with an electric auxiliary drive. The bicycle comprises a front wheel 301, a rear wheel 302, a frame 303, two shock devices 1 acting as shock absorbers namely, a suspension fork 304 and a rear wheel damper 305, a handlebar 306 and a saddle 307. The drive 312 is provided by pedals and presently, a chain-shifting device or derailleur. Disk brakes 311 may be provided. The front wheel 301 and the rear wheel 302 are each fastened to the fork 304 respectively the frame 303 by way of a quick release device. Each of the wheels comprises spokes 309 and a rim 310 as well as a hub 308. This mountainbike 300 comprises two shock absorbers 1 namely, the suspension fork 304 and the rear wheel shock absorber 305.

Figure 2:
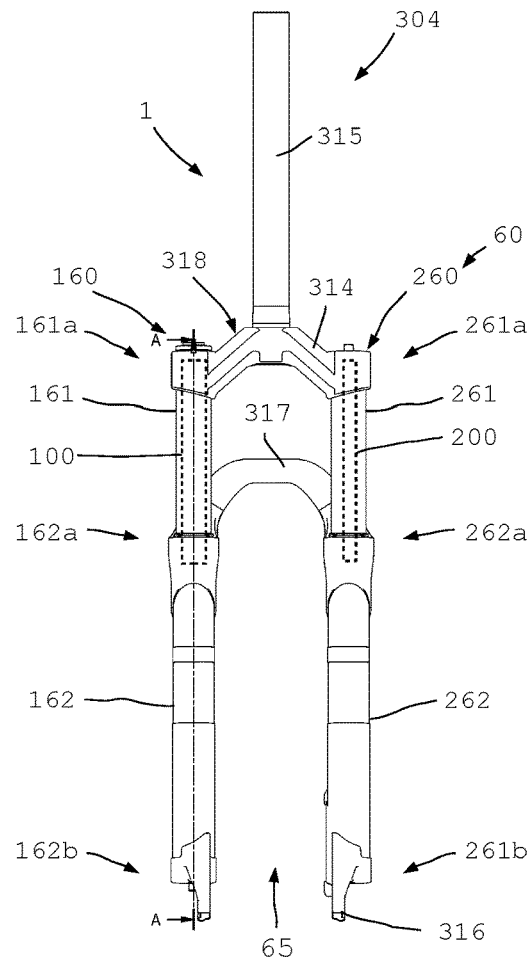
FIG. 2 a front view of the suspension fork of the mountainbike of FIG. 1.

FIG. 2 shows a front view of the suspension fork 304 of the mountainbike 300 of FIG. 1. The suspension fork 304 comprises a fork column 315 connected with the top unit 318. The top unit 318 further comprises the fork crown 314 and the stanchion tubes 161 and 261. The top unit 318 cooperates with the bottom unit 317 which comprises the slider tubes 162 and 262. The lower ends 162b, 262b of the slider tubes 162 and 262 are each provided with a dropout 316. The top ends 161a and 261a of the stanchion tubes 161 and 261 are provided with the fork crown 314 (see FIG. 7). The top ends 162a and 262a of the slider tubes 162 and 262 surround the bottom ends 161b and 261b of the stanchion tubes 161 and 261. The wheel receiving space 65 is configured between the tube systems 160 and 260.

This suspension fork 304 comprises two tube systems 60 namely, the tube system 160 accommodating the damping system 100, and the tube system 260 accommodating the suspension system 200.

Figure 3:
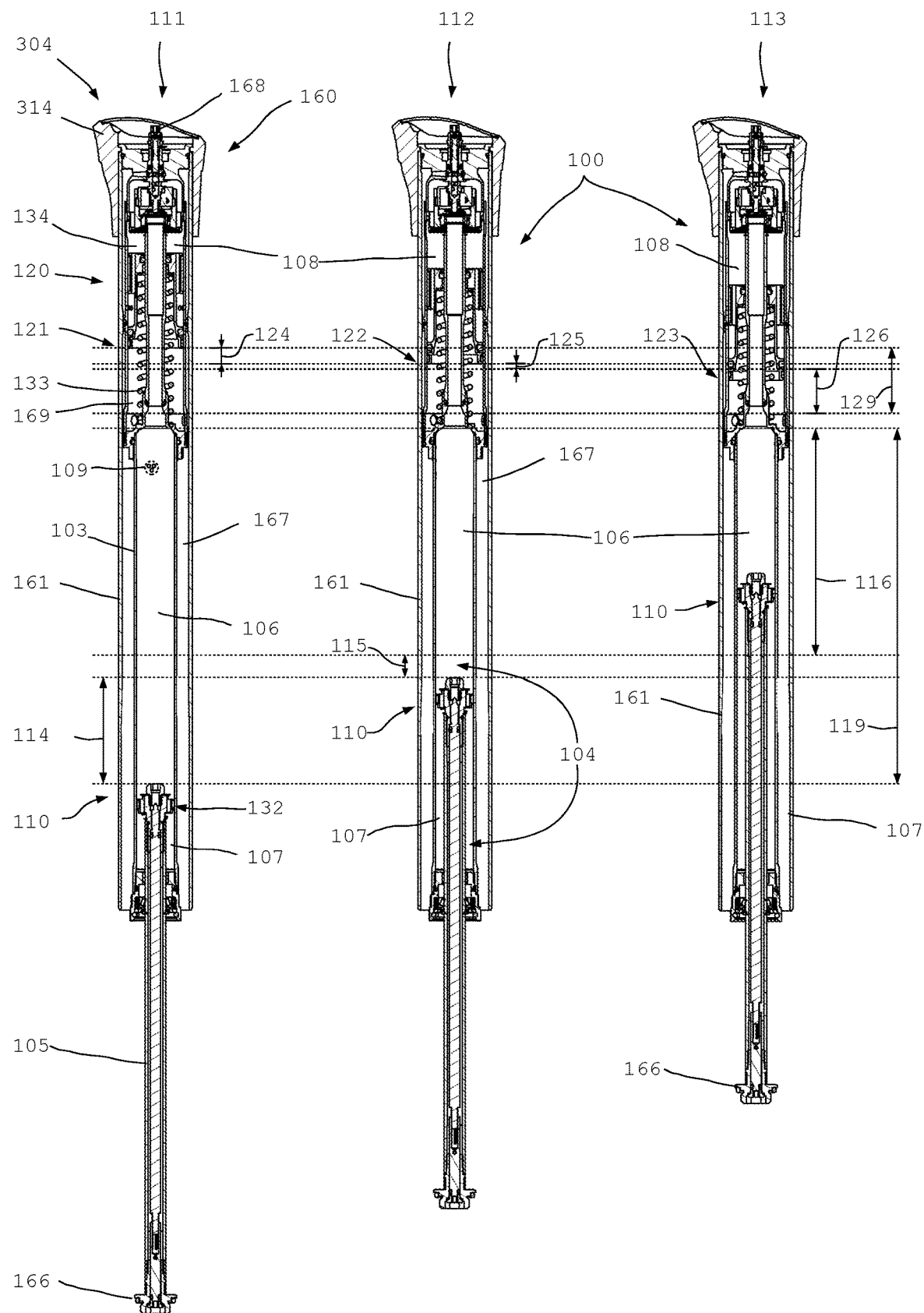
FIG. 3 a schematic cross-section of three degrees of compressed positions of the suspension fork of FIG. 2.

FIG. 3 shows in adjacent schematic cross-sections three illustrations of the tube system 160. FIG. 3 shows on the left the tube system 160 in the base position 111 or an initial position while in the center the tube system 160 is illustrated in a transition position 112 and on the right, in a further plunged-in position 113.

The fork crowns 314 can be recognized at the top ends of the tube systems 160. The top end of the tube system 160 shows an operating member 168 for setting and adjusting the damping characteristics.

The tube system 160 comprises a stanchion tube 161 and the slider tube 162 (not shown) surrounding the piston rod 105 when mounted.

A damper cylinder 103 is firmly received in the interior of the stanchion tube 161. The piston or damper piston 110 divides the damping volume 104 variably into a first damping chamber 106 and a second damping chamber 107. In the piston 110 a throttle unit 132 is disposed for damping the transition of the damping fluid 109 from the first damping chamber 106 into the second damping chamber 107 and reversely.

As the piston rod 105 enters the damper cylinder 103, a part of the volume of the piston rod 105 likewise enters the damper cylinder 103. The corresponding volume of the piston rod 105 must be displaced out of the damper cylinder 103 and exits upwardly out of the damper cylinder 103 and is conveyed into the auxiliary chamber 108.

The auxiliary chamber 108 is subdivided by a dividing piston 120, providing an equalizing volume 134. The dividing piston 120 is biased by a biasing device 133.

In the position illustrated on the left in FIG. 3 the suspension fork 304 or the damping system 100 is in the base position 111, which may be the maximum rebound position or else e.g. corresponds to the sag position which is achieved as the rider mounts the bicycle at standstill.

The bottom end of the piston rod 105 has a bottom connector 166 for connecting with the slider tube, not shown in FIG. 3. A hollow space 167 (filled with air as a rule) is configured radially between the outer wall of the damper cylinder 103 and the inner wall of the stanchion tube 161.

Above the damper cylinder 103, there is a hollow space 169 in which the biasing device 133 biasing the dividing piston 120 is disposed. Presently, a coil spring 133 acting as the biasing device is illustrated. It is also possible that the hollow space 169 serves as (a supplementary or the sole) air spring and thus as a biasing device 133 for biasing the dividing piston 120.

The center of FIG. 3 illustrates the tube system 160 of the suspension fork 304 in the transition position 112. In this transition position 112 the piston 110 has plunged further into the damper cylinder 103. Accordingly, the dividing piston 120 has shifted from the base position 121 to the transition position 122. The dividing piston has traveled over a first travel distance 124 while the piston 110 has traveled over a first travel distance 114. The travel distances 114 and 124 are proportional relative to one another. This piston 110 reaches the transition section 115 and the dividing piston 120, the transition section 125 in which the dividing piston 120 starts closing an aperture 138 (or multiple apertures 138 distributed over the circumference).

The damper cylinder 103 comprises a damping volume 104 formed by the first damping chamber 106 and the second damping chamber 107.

As the tube system 160 continues compressing, it will ultimately show the position illustrated in FIG. 3 on the right, where the tube system 160 and thus the piston 110 are located in a further plunged-in position 113. This plunged-in position 113 is located in the second travel distance 116 between the transition section and the end position. The second travel distance 116 preferably extends over more than half the piston stroke 119. Preferably, the length of the first travel distance 114 is between one fifth and two fifths relative to the piston stroke 119. In preferred embodiments, the proportion of the first travel distance is approximately one third (+/−10%) of the piston stroke 119.

In other configurations, the length of the first travel distance 114 may be up to half or as much as 60% of the piston stroke 119 (or more). Then, the second travel distance is correspondingly shortened to 30% or 40% and the transition section extends over the distance remaining between.

The piston 110 is located in the illustration on the right in FIG. 3 in the plunged-in position 113. Accordingly, the dividing piston 120 has taken a plunged-in position 123 and is located in the second travel distance 126. The dividing piston 120 can travel over one piston stroke 129.

Figure 4:
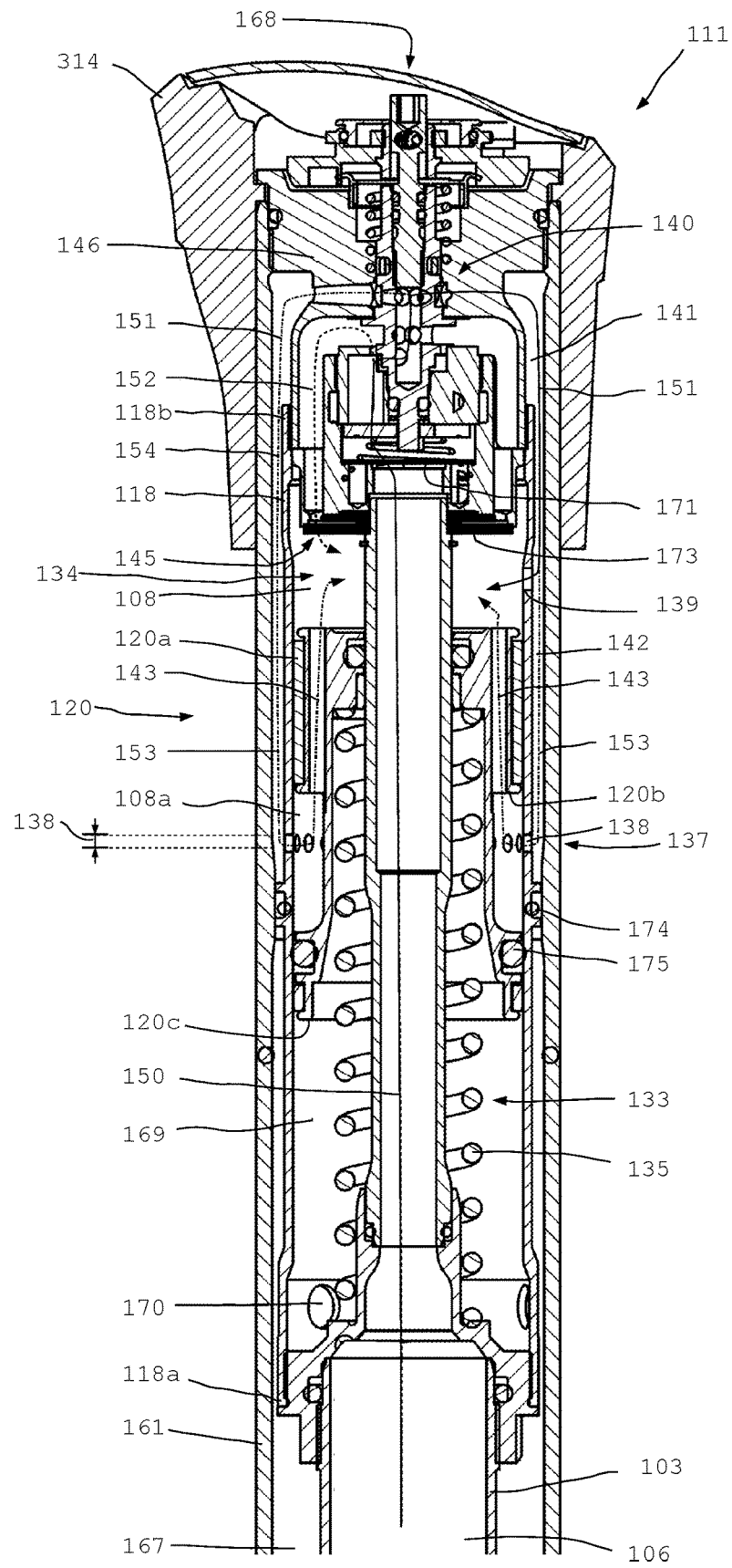
FIG. 4 an enlarged detail of FIG. 3 in the base position.

FIG. 4 shows an enlarged detail from the illustration on the left in FIG. 3. The top part of the tube system 160 is shown with the fork crown 314 recognizable in section at the top end. The damping can be set and adjusted by way of the operating member 168.

The biasing device 133 is disposed above the damper cylinder 103 and it may comprise a steel spring 135 and/or a gas spring 136 for biasing the dividing piston 120 upwardly. The dividing piston separates the auxiliary chamber 108. The dividing piston 120 shows a low-friction bushing 120a on the outer circumference. While the biasing device 133 presses the dividing piston 120 upwardly in a central region of the dividing piston, a part 108a of the auxiliary chamber 108 is located radially outwardly of the dividing piston 120 and another part, above the dividing piston 120.

The damper cylinder 103 is mounted in the stanchion tube 161 so that a radial void or hollow space 167 forms.

In the exemplary embodiment, an insert 118 is placed on the top end of the damper cylinder 103. The bottom end 118a of the insert 118 may for example be screwed to the cap of the damper cylinder 103. The insert 118 is sealed via at least one seal 174 against the inner surface of the stanchion tube 161. Above the seal 174, which in the illustration of FIG. 4 is located approximately at the height of the seal 175 of the dividing piston 120, a radial gap 154 is formed between the insert 118 and the wall of the stanchion tube 161 which is used for transporting damping fluid in the auxiliary chamber 108.

The insert 118 shows at least two radial holes (rows of holes or series of holes) or apertures 138 and 139. The apertures 138 and 139 are disposed offset in the axial direction of the insert 118. In this illustration according to FIG. 4, the apertures 138, the majority of which is distributed over the circumference of the insert 118, are located between the bottom end 120b of the low-friction bushing 120a and the sealing 175 at the bottom end 120c of the dividing piston 120. Above the apertures 139, a (first) duct 141 is formed in the clearance between the insert 118 and the inner wall of the stanchion tube 161. Beneath the apertures 138, a (second) duct 142 is formed up to the apertures 139 in the clearance between the insert 118 and the inner wall of the stanchion tube 161.

The apertures 139, one aperture 139 of which is exemplarily shown in FIG. 4, are configured above the top end of the dividing piston 120 in the radial wall of the insert 118.

The apertures 138 form a valve 137 for the damping fluid 109 to flow from the duct 142 into the auxiliary chamber 108. The aperture 139 or the apertures 139 likewise form a valve for the damping fluid 109 to flow from the duct 141 into the auxiliary chamber 108.

A control insert 146 is fed into the insert 118 at the top end 118b of the insert 118 so that the bottom end 118a of the insert is connected with the damper cylinder 103 and the top end 118b of the insert 118, with the control insert 146.

In the exemplary embodiment, the radial hollow space 167 between the damper cylinder 103 and the stanchion tube 161 is connected through apertures 170 with the hollow space 169 which accommodates the biasing device 133 for the dividing piston 120. It is also possible to use a gas spring 136 for biasing the dividing piston 120. Then, the apertures 170 are normally closed or entirely absent.

In compressing, damping fluid 109 flows upwardly through the central duct along the flow path 150 into the control insert 146. In the case of weak shocks, only the throttle 140 for low speed will open and in the rebound position illustrated in FIG. 4 the damping fluid can enter along the flow path 151 into the radial gap 154 between the insert 118 and the inner wall of the stanchion tube 161.

The damping fluid can, starting from the radial gap 154 in the further rebounded position 111 (e.g. the base position 111) illustrated in FIG. 4, enter through the apertures 138 and 139 into the auxiliary chamber 108. The apertures 138 and 139 overall provide a large flow cross-section so that the compressing operation in the compression stage is only slightly damped in the base position 111 shown. The flow path 151 through the apertures 139 is indicated at the solid-line arrow. The flow path 153 through the apertures 138 is shown at the broken-line arrow 153. The flow path firstly runs along the flow path 151 into the radial gap 154. Part of the damping fluid 109 immediately transfers into the auxiliary chamber 108 through the apertures 139. Another part flows along the radial gap 154 further through the second duct 142 up to the apertures 138, which run toward the chamber section 108a of the auxiliary chamber 108. The damping fluid 109 now in the chamber section 108a may then be guided radially inwardly through the feedback channel 143 from the bushing 120a upwardly into the main portion of the auxiliary chamber 108.

The two active apertures 138 and 139 achieve a low damping rate in the range of low flow rates (low speed) in the compression stage so as to provide soft responsivity.

For forceful shocks, the flow path 152 for high speeds (high speed) is additionally opened by way of the throttle 145. The flow path 152 is shown at the broken-line arrow. In the case of forceful shocks, the shim valve 173 opens so that the flow path 152 is also available for effective transfer of damping fluid 109 into the auxiliary chamber 108.

In the rebound stage, the biased one-way valve 171 allows return flow of the damping fluid 109 (in particular oil).

In the base position 111 illustrated in FIG. 4, weak damping is provided for weak shocks. For forceful shocks, the damping provided is accordingly stronger.

Figure 5:
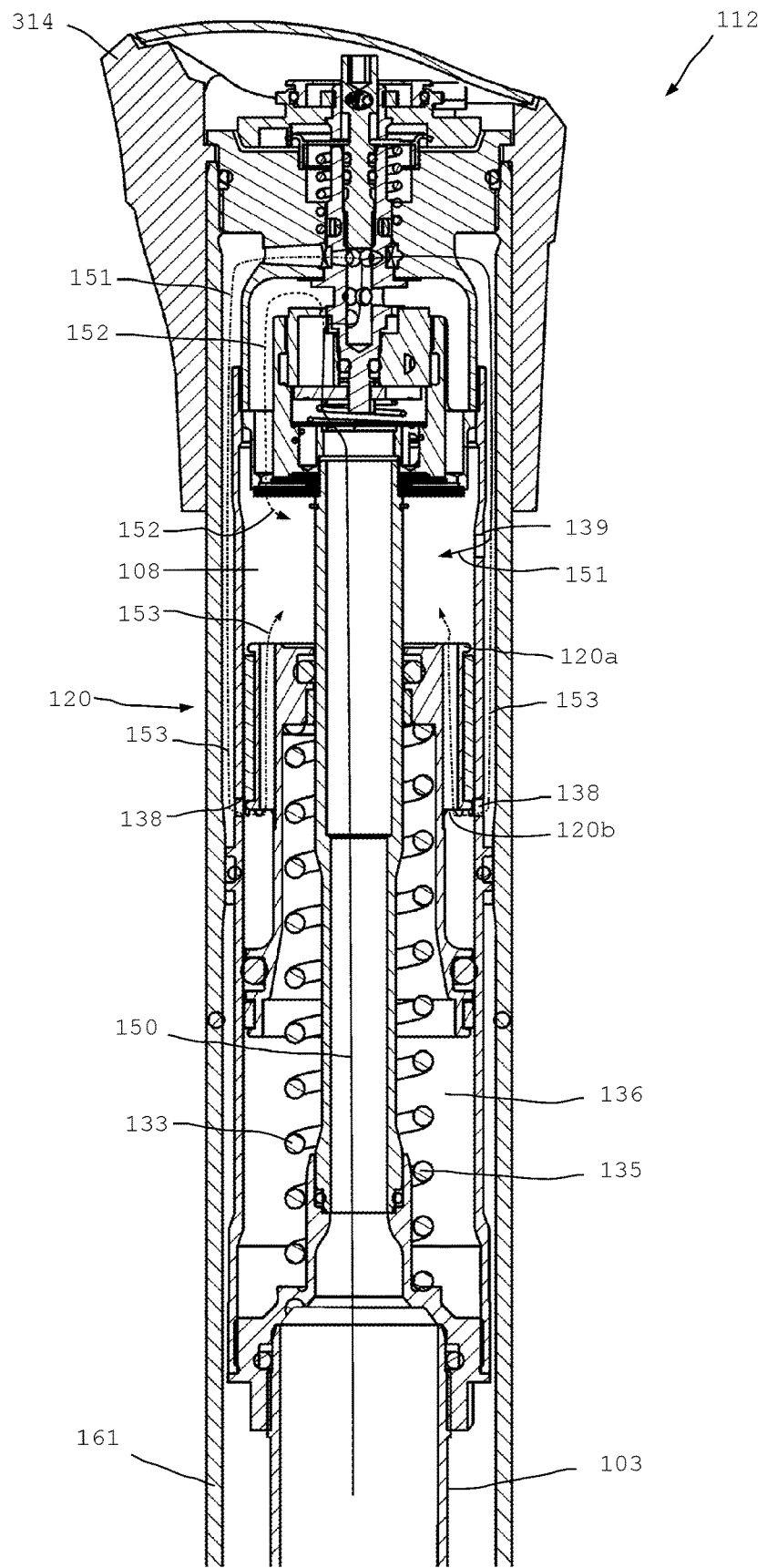
FIG. 5 an enlarged detail of FIG. 3 in the transition position.

FIG. 5 shows an enlarged region of the stanchion tube 161 of the suspension fork 304 in a transition position 112 in which the suspension fork is compressed further. Due to the piston rod 105 plunging into the damper cylinder 103, a certain quantity of damping fluid 109 has been displaced into the auxiliary chamber 108 so that the dividing piston 120 has correspondingly shifted downwardly. Thus, the bottom end 120b of the bushing 120a shifts downwardly as well until the end 120b in the position shown in FIG. 5 ultimately begins to close the apertures 138 partially and finally completely. The transition section 115 of the piston 110 and the pertaining transition section 125 of the dividing piston 120 begin respectively extend in this region. Thus, the flow path 153 shown in broken lines for the damping fluid 109 is closed partially and finally completely. At the end of the transition section 125, the flow path 153 is completely closed by way of the apertures 138.

For damping at low piston speeds only, the flow path 151 through the aperture 139 out of the radial gap 154 into the auxiliary chamber 108 is available from the end of the transition section 115 of the piston 110 respectively the suspension fork or the transition section 125 of the dividing piston 120 formed thereby. In the case of forceful shocks, the high speed valve will open additionally and the flow path 152 will open (shown in broken lines).

In a concrete embodiment the entire piston stroke 119 measures approximately 160 mm. The length of the first travel distance 114 without the transition section is 50 mm. The transition section 115 begins at 50 mm and ends at 70 mm. The transition section 115 and/or 125 is in particular shorter than 25% or 20% of the maximum piston stroke 119.

The second travel distance 114 in particular follows the transition section 115, extending over a length between 40% and 60% of the maximum piston stroke.

FIG. 5 shows for better illustration a variant which may be provided with no apertures 170 at the bottom end of the insert 118. This variant may be operated absent a steel spring 135 and using a gas spring 136 only.

Figure 6:
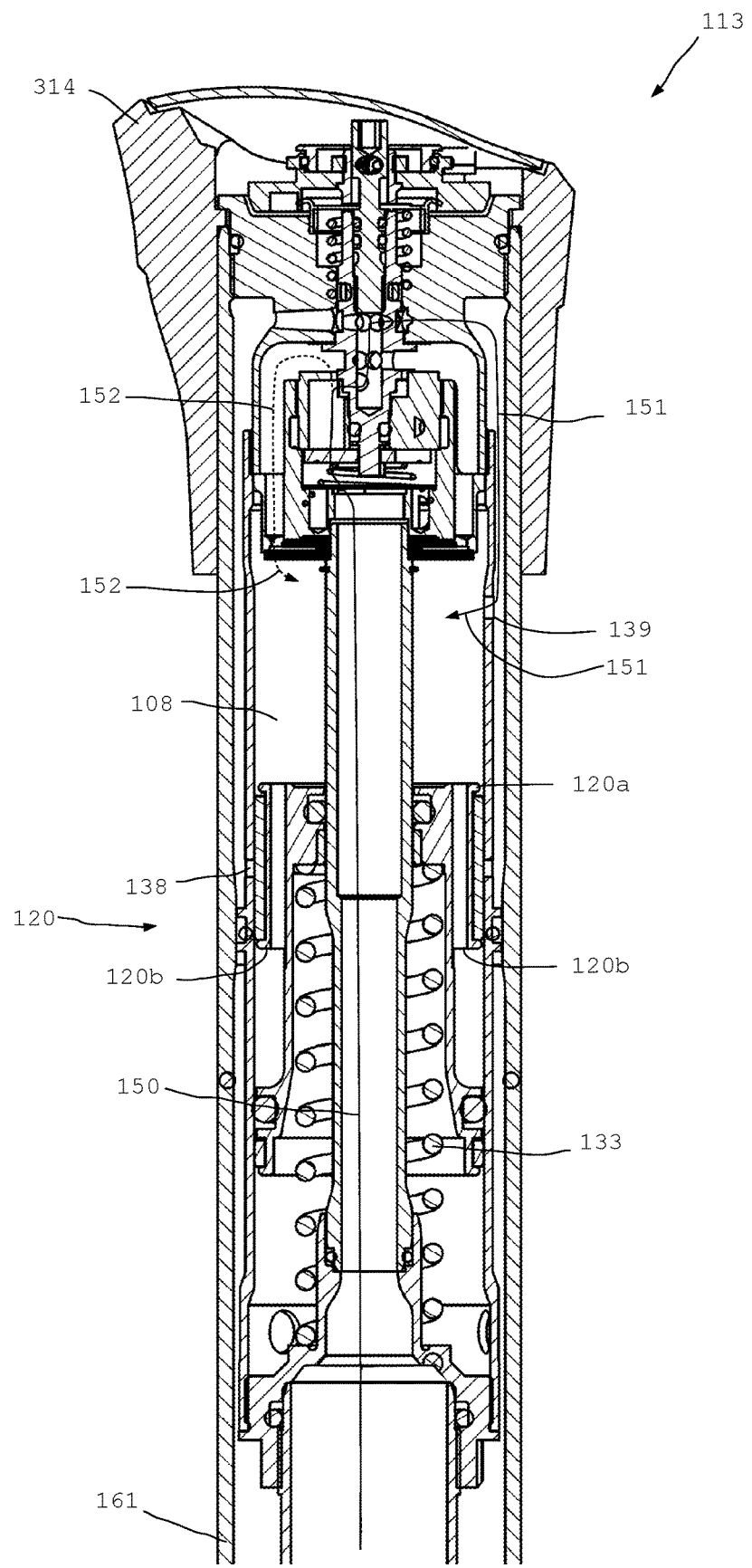
FIG. 6 an enlarged detail of FIG. 3 in another position.

FIG. 6 finally shows a detail similar to the FIGS. 4 and 5 where the suspension fork or the piston 110 is located in the second travel distance 116 and is thus compressed further. In this second travel distance 116, the dividing piston 120 or the bushing 120a is located in the second travel distance 126 and the bushing 120 closes the apertures 138 completely. In this plunged-in position 113 only the flow path 151 through the apertures 139 remains available for weak shocks. In the case of forceful shocks, the flow path 152 will open also.

The damping system 100 of the suspension fork 304 has been illustrated in the FIGS. 2 to 6. With reference to the FIGS. 7 to 12 the suspension system 200 respectively various suspension systems 200 for the suspension fork 304 will now be discussed.

Figures 7, 8:
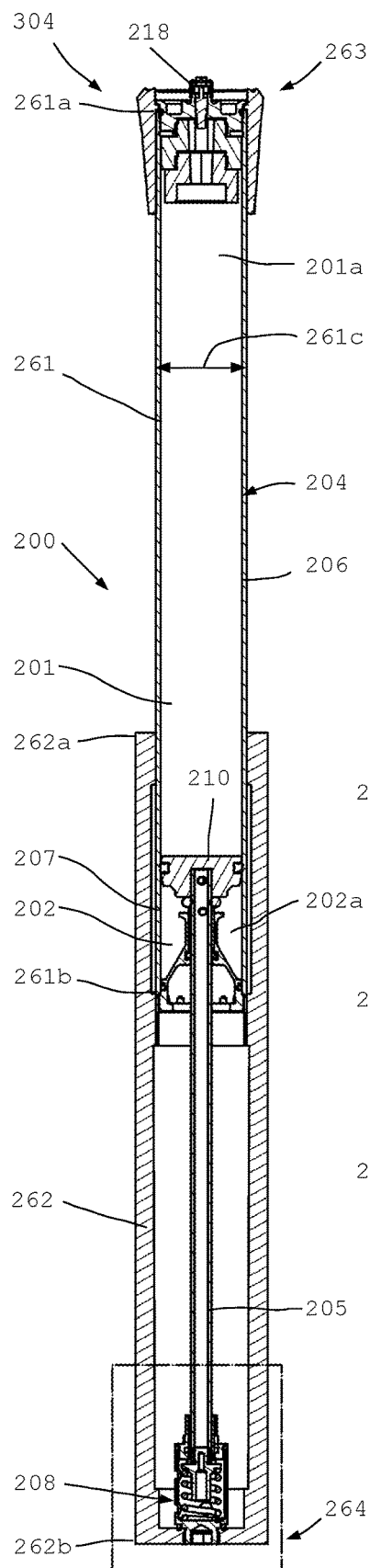
FIG. 7 a cross-section of the other leg of the suspension fork in rebound.
FIG. 8 an enlarged detail of FIG. 7.

FIG. 7 shows a schematic cross-section of the tube system 260. The tube system 260 comprises a tube 261 being the stanchion tube and a tube 262 being the slider tube. The tubes 261 and 262 are telescopic relative to one another, extending from a first, presently the top, end 263 toward a second, presently the bottom end 264. The top and/or bottom end/s may be provided with adjustment members for the spring characteristics. The top end is provided with an air valve 218 for filling the positive air spring 201.

The volume 204 of the stanchion tube 261 is separated by way of the suspension piston or piston 210 into a positive air spring 201 and a negative spring 202. In the illustrated extended position 211, which may optionally be identical with the base position 111 of the damping system 100 in FIG. 3, the positive air spring 201 comprises a volume 201*a* and the negative spring 202 comprises a volume 202*a*.

The piston rod 205 extends from the piston 210 downwardly through the bottom end of the stanchion tube 261 and at the bottom end 264 it is connected with the slider tube 262.

The positive air spring 201 comprises a positive chamber 206 and biases the suspension system 200 to the extended position 211 as illustrated. The negative spring 202 comprises a negative chamber 202 and counteracts the force of the positive air spring 201. This improves the characteristic curve of the suspension system 200.

These kinds of suspension systems 200 in which a positive air spring and optionally also an air spring for a negative spring 202 is/are used, enable suspension forks showing a particularly low weight. Another advantage of using these kinds of gas springs is the fact that adapting the internal pressure allows to obtain easy adaptation to the rider's weight. While steel springs require exchanging the effective steel spring for (highly) differing rider's weights, the use of gas springs allows for ease of pressure modification.

The drawback of gas springs is the increased friction due to the required seals. With very weak shocks, the friction between the piston and the inner wall of the stanchion tube and the friction between the piston rod and the lower cap of the stanchion tube may cause the responsivity of a gas spring-operated suspension fork to be less soft than would be desirable.

The suspension fork 304 solves this problem by means of a supplementary spring 208 installed at the lower end of the piston rod 205. The supplementary spring 208 has a spring member 209 that is in particular configured as a coil spring. Basically, such a coil spring shows virtually no friction. The responsivity of the supplementary spring 208 is much softer than that of the positive air spring 201.

The positive air spring 201 and the supplementary spring 208 are series-connected so that in case of weak shocks, the spring which must overcome a lower friction will act first. In this case, this is the supplementary spring 208 (unless it is compressed completely).

The maximum force of the supplementary spring 208 is considerably lower than is the maximum force of the positive air spring 201. Given maximum stroke travel of the supplementary spring 208 the ratio of the spring force of the supplementary spring 208 to the spring force of the positive air spring 201 is in particular lower than 20:10 and higher than 1:10.

The suspension travel of the supplementary spring 208 is likewise considerably shorter than is the suspension travel of the positive air spring 201. In this case, the ratio of the suspension travel of the positive air spring 201 to the suspension travel of the supplementary spring in complete rebound is higher than 4:1. In the exemplary embodiment the supplementary spring 208 shows suspension travels of 6 mm, 8 mm, 10 mm or 12 mm or 14 mm. The suspension travel of the suspension system 200 overall is preferably at least 100 mm and may be 120 mm, 140 mm or 160 mm or 180 mm, or may show any value in-between or higher. This results in a ratio of the suspension travel of the positive air spring and the supplementary spring 208 of higher than ten and the ratio may reach or exceed a value of 15 or 20. The ratio range of suspension travel of the positive air spring and of the supplementary spring 208 is preferably between 5 and 30.

In many cases, the supplementary spring 208 is already compressed completely in the sag position. The sag position may be set and adjusted for den rider by way of the air pressure and in most cases it will be set to 20% or 25% or 30% of the suspension travel. This means that in a static initial position with the rider sitting quietly on the stationary bicycle, a suspension fork will already be compressed approximately 40 mm given a sag of 25% and suspension travel of 160 mm. For illustrating the principle, the FIG. 7 shows a position in which the supplementary spring 208 is not yet compressed completely. This position may also be given if, following compression of the positive air spring 201 and the supplementary spring 208, both will initially rebound.

The ratio of the stroke length of the positive air spring to the suspension travel of the supplementary spring is in particular higher than the ratio of the volume of the positive chamber to the volume of the negative chamber in the extended position 211. The ratio of the volume of the positive chamber 206 to the volume of the negative chamber in the extended position 211 is in particular higher than 1.6. The region of the supplementary spring 208 of FIG. 7 is shown enlarged in FIG. 8. It can be seen that the supplementary spring 208 is accommodated in a guide housing 221. The guide housing 221 consists of a top housing part 228 and a bottom housing part 223. The guide housing 221 is preferably provided with holes 227 to enable fluid exchange with the inner space of the slider tube 262. The bottom housing part 223 shows a tool engagement point, exemplarily an internal hexagon 224. This allows screwing the bottom housing part 223 to the lower end 262*b* of the slider tube 262. The supplementary spring 208 may be replaced by a stronger or weaker spring as required. The spring member 209 of the supplementary spring 208 is accommodated in the interior of the guide housing 221. The spring member 209 is configured as a coil spring and is operative between the bottom supporting surface of the bottom housing part 223 and the top support unit 222 which is connected with, for example screwed to, the bottom end of the piston rod 205.

Between the bottom end of the top housing part 221 and the top end of the top support unit 222, a top-out damping 220 may be provided which is for example configured as an elastic ring or rubber ring or the like. An O-ring or a quadring or another suitable type of elastic ring may be used. The top-out damping 220 achieves smooth transition as the supplementary spring 208 reaches the limit of its suspension travel.

In the illustrated extended position 211, the supplementary spring 208 preferably shows a spring force lying in a range between one fourth of the spring force of the positive air spring 201 in the extended position 211 and four times the spring force of the positive air spring 201 in the extended position 211. In preferred configurations, the ratio of the spring force lies between 2:1 and 1:2 and in concrete configurations it may be approximately 1:1.

It is possible for the spring force of the supplementary spring to be the weakest possible in extreme rebound to enable very soft responsivity.

It is particularly preferred for the supplementary spring 208 to show a particularly weak breakaway force. The breakaway force of the supplementary spring 208 is in particular weaker than that of the remaining suspension system, and particularly preferably weaker than the breakaway force of the positive air spring 201. Particularly preferably, the breakaway force of the supplementary spring 208 is zero.

A differentiation must be made between the breakaway force and the acting force of the pertaining spring and the suspension system in operation. In normal operation (or with a rider sitting on the bicycle) and with the shock device being in an intermediate position, e.g. in the sag position, the external forces and the forces of the suspension system in a static state are in balance. Since the breakaway force of the supplementary spring 208 is very weak, every minor or minute shock causes spring motion of the suspension system 200, unless the supplementary spring 208 is on block.

Then a shock of a force weaker than the breakaway force of the positive air spring will only make the supplementary spring compress. The suspension system responds to weak and extremely weak shocks. Shocks showing a force acting on the suspension system 200 that is higher than the breakaway force of the positive air spring will also make the positive air spring 201 move. In all the cases, a soft responsivity is obtained. This applies in particular if the suspension system 200 rebounds, following e.g. a certain shock. Then, the supplementary spring responds immediately by rebounding along unless its maximum force is exceeded.

In a concrete configuration, the spring constant of the supplementary spring 208 is approximately 28 N/mm or 28/mm and the possible stroke length is 8 mm or 10 mm.

The supplementary spring 208 allows a more delicate responsivity of the suspension fork 304, contributing to linearization of the characteristic curve of the suspension fork 304. Even if the supplementary spring 208 shows soft compression the damping system 100 is effective so that even if only the supplementary spring 208 shows spring movement, such movement is damped by means of the damping system 100.

A zero passage of the spring characteristics is obtained since the supplementary spring has no breakaway force. This eliminates impacts on the rider's wrist when hitting the ground such as they are caused by the breakaway force.

Figure 9:
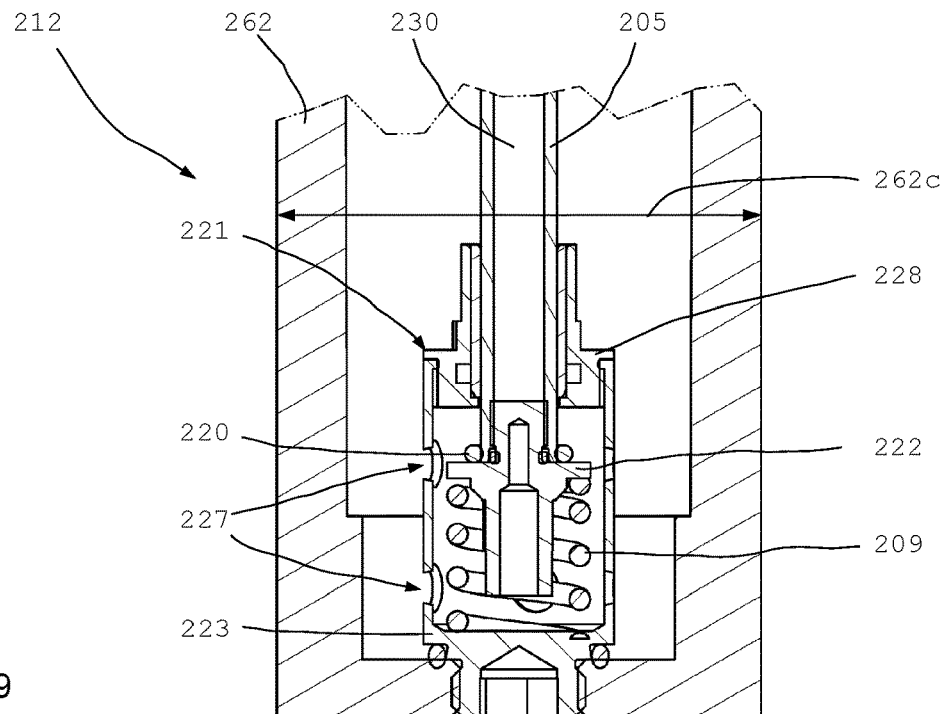
FIG. 9 an illustration according to FIG. 8 in a medium position.
Figure 10:
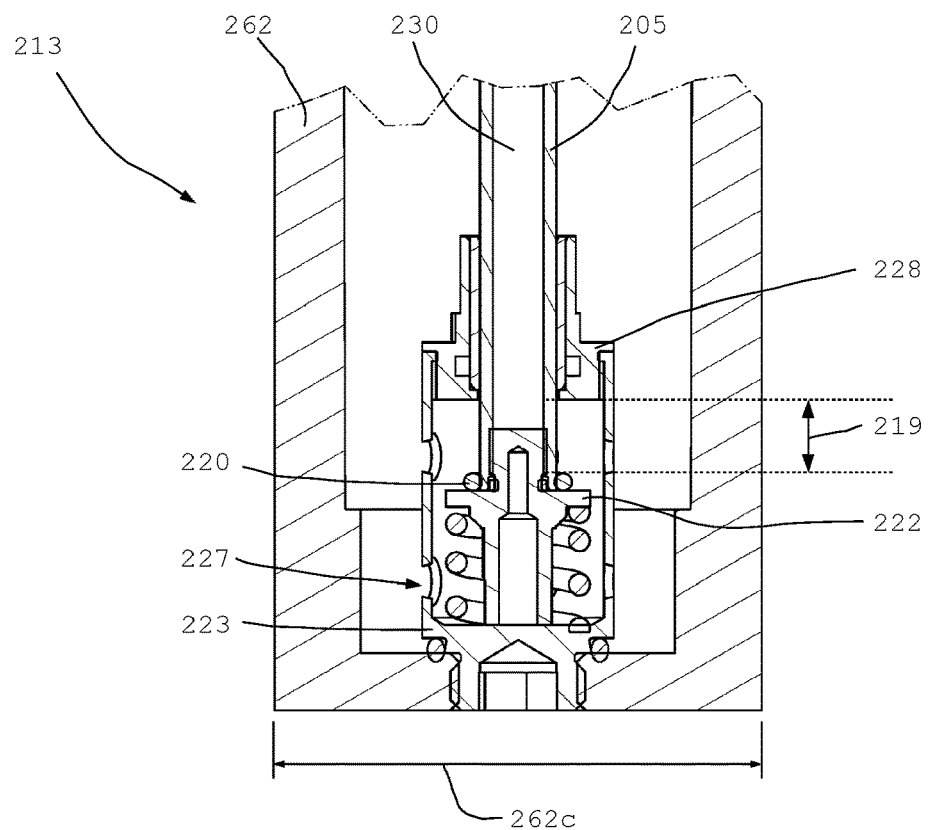
FIG. 10 an illustration according to FIG. 8 in an end position.

FIGS. 9 and 10 show the region of the supplementary spring 208 wherein in FIG. 9 the supplementary spring is in a transition position 212 and in FIG. 10, in the end position 213. The stroke length 219 of the supplementary spring 208 is utilized in full in FIG. 10. The stroke length 219 of the supplementary spring 208 is in particular shorter than the diameters 261c and 262c of the tubes 261 and 262. The inner diameter 261c of the tube 261 preferably lies between 15 and 50 mm and it may be e.g. 24.6 mm. The outer diameter 262c of the tube 262 preferably lies between 20 and 60 mm and it may be e.g. 31.4 mm. The stroke length of the entire suspension system is, however, a multiple (>3 or >4 or >5 or >10 and presently >15) of the stroke length 219. Preferably, the stroke length 219 at least substantially corresponds to the piston stroke 119 and is e.g. approximately 160 mm. Although the stroke length 219 and the piston stroke 119 may differ somewhat due to e.g. manufacturing conditions, they are preferably (at least nearly) identical.

By way of the supplementary spring 208, better responsivity may be achieved as compressing begins or while the supplementary spring 208 is not on block. The spring force and the stroke length 219 of the supplementary spring 208 may be dimensioned such that even in the sag position the available stroke length for the supplementary spring 208 is still considerable so that the supplementary spring 208 is for example in the position illustrated in FIG. 9 when in the sag position.

However, it is likewise preferred for the supplementary spring 208 to be compressed completely in the sag position in the static state of rest. In real riding operation, the shock device returns to rebound following a shock. Then e.g. in jumps or brief loss of ground contact, the supplementary spring 208 also rebounds so that the supplementary spring 208 may compress (shortly) after rebounding.

FIG. 11 shows another configuration of a suspension system 200. This suspension system 200 is in turn accommodated in the stanchion tube 261 of the tube system 260. The suspension system 200 according to FIG. 11 may, as does the suspension system 200 according to FIG. 7, comprise a mechanical supplementary spring 208 at the bottom end of the piston rod 205. The corresponding bottom region of the piston rod is preferably configured in analogy to the FIGS. 7 to 10.

This suspension system 200 comprises a positive air spring 201 having a positive chamber 206 above the piston 210. The negative spring 202 having a negative chamber 207 is disposed between the bottom end of the piston 210 and the bottom cap of the stanchion tube 261.

The piston 210 runs within a cylinder device 203 that is inserted in the interior of the stanchion tube 261. This cylinder device 203 is configured open on top so that the hollow space 231 surrounding the cylinder device 203 provides, between the cylinder device and the inner wall of the stanchion tube 261, an additional hollow space 231 contributing to the volume of the positive air spring 201. A seal 239 is provided in an axial position in the hollow space between the cylinder device 203 and the stanchion tube 261. The seal 239 separates the top region including the additional hollow space 231 from a bottom region including another hollow space 232. While the additional hollow space 231 communicates with the positive chamber 206, the further hollow space 232 communicates with the negative chamber 207 via flow apertures 234. The additional hollow space 231 communicates with the positive chamber 206 via a flow aperture 233 in the shape of an annular gap.

The additional hollow space 231 and the further hollow space 232 each enlarge the volume 201a available to the positive air spring 201 and the volume 202a available to the negative spring 202, by the additional hollow space 231 respectively the further hollow space 232. Expressed reversely, the surface on which the piston 210 acts in compressing and rebounding is reduced.

The enlarged volume 201a of the positive air spring 201 and the enlarged volume 202a of the negative spring 202 achieve a reduced progression in compressing and rebounding. In this way, the characteristic curve of the suspension fork is linearized. The ratio of the volume 201a to the piston diameter 210a is enlarged over a conventional suspension system showing the same outer dimensions. This means that both the progression of the positive air spring and also the progression of the negative air spring are reduced so as to provide a characteristic curve showing increased linearity overall.

Furthermore, it is possible to connect for example the negative chamber 207 with the inner space of the piston rod 205 via a flow aperture 235. Then, the inner space of the piston rod 205 serves as a (further) supplementary hollow space 230 for the negative spring.

Depending on the structure it is also possible to connect the inner space 230 of the piston rod 205 with the positive chamber 206, separating it from the negative chamber 207.

To this end for example a longitudinal bore through the piston 210 may be made for connecting the positive chamber 206 with the supplementary hollow space 230. Accordingly, the flow aperture 235 is then closed.

The reference numeral 238 denotes a connection member for connecting the piston 210 with the piston rod 205.

The bypass 225 illustrated in the FIG. 11 somewhat above the piston 210 connects the positive chamber 206 with the negative chamber 207, while the piston 210, respectively the seal of the piston 210 is located level with the bypass 225. This enables pressure exchange between the positive chamber 206 and the negative chamber 207 in this position. Thus, automatic pressure exchange between the positive chamber 206 and the negative chamber 207 takes place every time the piston 210 is in the proper position.

The slider tube 262 is guided via guide bushings 237 on the stanchion tube 261. The void 236 beneath the guide bushing 237 serves to reduce friction.

FIG. 12 shows an enlarged detail from FIG. 11 in which the aperture 234 and the bypass 225 can be better seen.

On the whole, the suspension fork provides an advantageous system which enables softer damping and softer cushioning in a first suspension travel section. Damping is varied in relation to the travel length. While damping is greatly reduced over a first travel portion only, damping will be decreased to normal for example after one third or 40% of the suspension travel length.

In cushioning, the supplementary spring 208 likewise enables softer responsivity. This achieves better damping for minor shocks and ground unevennesses. Increasing the ratio of spring volume to piston surface allows achievement of an even further improved linearization of the spring characteristics.

The suspension system 200 allows to linearize the typical waveform of a characteristic air spring curve.

In general, it is significant for the present application to bear in mind that during riding, the front wheel of a bicycle tends to frequently lose ground contact. Then, the suspension fork will rebound (completely) every time, and thus the supplementary spring will be employed even if the supplementary spring 208 is already on block in the static sag position.

Air suspension systems provide for seals at the piston and the piston rod for generating friction. The breakaway force or static friction (the force required for generating movement) it particularly undesirable if soft response of a shock device configured e.g. as a suspension fork is intended.

The supplementary spring 208 in the piston rod allows movement of the suspension fork already prior to reaching or exceeding the breakaway force (frictional force). Measurements performed in a concrete example showed a breakaway force of 20N.

Strictly speaking, an air suspension system per se does not show spring characteristics (force path illustrated by way of the suspension travel) running through the origin point of the coordinate system where the suspension travel and the force are both zero. This is due to the breakaway force to be overcome for a shock device to compress. A shock device 1 equipped with a supplementary spring 208, however, allows immediate movement of the shock device 1 (e.g. a suspension fork), even if the positive air spring per se begins moving with a force higher than or equal to 28 N (or e.g. 20 N, depending on the configuration). The supplementary spring 208 allows direct cushioning every time the wheel hits the ground. Absent this supplementary spring 208, an impact of 20N might be transmitted unsprung into the rider's hands. The spring characteristics travel through the zero point.

A suspension system 200 shows a more linear characteristic curve and has considerable advantages. The suspension system 200 offers soft responsivity because in the first region (or until the curves of the positive air spring and the supplementary spring meet) of the suspension travel less force is required for riding over the same obstacle or for covering the same suspension travel.

An improved supporting effect is achieved in the middle region of suspension travel because suspension travel shows increased linearity overall.

Basically, a steel spring shows more linearity than does a conventional air suspension system having a positive air spring and a negative air spring. In a conventional air suspension system showing the same force increase, the conventional air suspension system travels over a clearly longer distance than does a linear steel spring. In conventional air suspension systems, this may cause the suspension fork to plunge in situations where the suspension fork is already slightly compressed, such as during braking in a downhill ride with obstacles on the ground. This will leave relatively little suspension travel which may cause the rider to feel less than secure because the load shifts still further forwardly and little suspension travel buffer remains for unexpected events. The shock device 1 presently introduced offers better predictability of behavior and thus a safer feeling for the rider.

For better linearization of the characteristic curve of the suspension system 200, the shock device 1 preferably provides for increased volume of both the air chambers (positive air chamber and negative chamber) over the prior art or for reduced piston diameters relative to the volume of the air chambers. This achieves lower progression at two ends of the suspension travel and reduces a typical "wave" or reversed "S shape" of the air suspension.

It is advantageous that the supplementary spring 208 is series-connected with the air suspension (positive air spring and negative spring) which acts in a first range of the suspension travel. In the exemplary embodiment, the supplementary spring 208 acts until the force of the supplementary spring 208 acting on the suspension fork 224 reaches Newton (N).

A comparison of two suspension forks having the same settings (one conventional without a supplementary spring and one shock device 1 with a supplementary spring 208) against e.g. identical sag of 25% clearly shows that in front of the sag position the responsivity is softer because the force path over the suspension travel runs beneath the curve of the conventional suspension fork. Above the sag position (in longer suspension travel) the curve is clearly more linear and thus better to estimate or calculate for the rider. The supplementary spring makes the suspension system more sensitive and effective even with very weak forces, while a conventional air suspension system first needs to overcome a breakaway force which is not negligible. Traction is improved.

While a particular embodiment of the present shock device has been described herein, it will be appreciated by those skilled in the art that changes and modifications may be made thereto without departing from the invention in its broader aspects and as set forth in the following claims.

LIST OF REFERENCE NUMERALS

| | |
|---|---|
| 1 | shock device, shock absorber |
| 60 | tube system |
| 65 | wheel receiving space |
| 100 | damping system |
| 103 | damper cylinder |
| 104 | damping volume |
| 105 | piston rod |
| 106 | first damping chamber |
| 107 | second damping chamber |
| 108 | auxiliary chamber |
| 108a | chamber section of 108 |
| 109 | damping fluid |
| 110 | piston |
| 111 | base position, initial position |
| 112 | transition position |
| 113 | plunged-in position |
| 114 | first travel distance |
| 115 | transition section |
| 116 | second travel distance |
| 118 | insert |
| 118a | bottom end |
| 118b | top end |
| 119 | piston stroke |
| 120 | dividing piston |
| 120a | bushing |
| 120b | bottom end of 120a |
| 120c | bottom end of 120 |
| 121 | base position, initial position |
| 122 | transition position |
| 123 | plunged-in position |
| 124 | first travel distance |
| 125 | transition section |
| 126 | further plunged-in travel distance |
| 129 | piston stroke |
| 132 | throttle unit |
| 133 | biasing device |
| 134 | equalizing volume |
| 135 | steel spring |
| 136 | gas spring |
| 137 | valve |
| 138 | aperture of 137 |
| 139 | aperture |
| 140 | throttle low speed |
| 141 | first duct |
| 142 | second duct |
| 143 | return duct |
| 145 | throttle high speed |
| 146 | control insert |
| 150 | flow path |
| 151 | flow path |
| 152 | flow path |
| 153 | flow path |
| 154 | radial gap |
| 160 | tube system |
| 161 | stanchion tube |
| 162 | slider tube |
| 166 | bottom connector |
| 167 | hollow space at 161 |
| 168 | operating member |
| 169 | hollow space at 161 |
| 170 | aperture |
| 171 | shim |
| 173 | shim |
| 174 | seal |
| 175 | seal |
| 200 | suspension system |
| 201 | positive air spring |
| 201a | volume of 201 |
| 202 | negative spring |
| 202a | volume of 202 |
| 203 | cylinder device |
| 204 | volume (in 261) |
| 205 | piston rod |
| 206 | positive chamber |
| 207 | negative chamber |
| 208 | supplementary spring |
| 209 | spring member, coil spring |
| 210 | piston |
| 210a | diameter of 210 |
| 211 | extended position base position |
| 212 | transition position |
| 213 | plunged-in position, end position |
| 218 | air valve for 201 |
| 219 | stroke length of 208 |
| 220 | top-out damping |
| 221 | guide housing |
| 222 | (top) support unit |
| 223 | (bottom) housing part of 221 |
| 224 | internal hexagon |
| 225 | bypass |
| 227 | hole in 221 |
| 228 | (top) housing part of 221 |
| 230 | supplementary hollow space (inner space of 205) |
| 231 | additional hollow space for 201 |
| 232 | further hollow space for 202 |
| 233 | flow aperture for 231 |
| 234 | flow aperture for 232 |
| 235 | flow aperture for 230 |
| 236 | void |
| 237 | guide bushing |
| 238 | connection members 205 + 210 |
| 239 | seal between 231 + 232 |
| 251 | air volume |
| 252 | air volume |
| 260 | tube system |
| 261 | tube, stanchion tube |
| 261a | 1st end of 261 |
| 261b | 2nd end of 261 |
| 261c | diameter |
| 262 | tube, slider tube |
| 262a | 1st end of 262 |
| 262b | 2nd end of 262 |
| 262c | diameter |
| 263 | 1st end |
| 264 | 2nd end |
| 300 | two-wheeled vehicle, bicycle |
| 301 | wheel, front wheel |
| 302 | wheel, rear wheel |
| 303 | frame |
| 304 | suspension fork |
| 305 | damper |
| 306 | handlebar |
| 307 | saddle |
| 308 | hub |
| 309 | spoke |
| 310 | rim |
| 311 | disk brake |
| 312 | drive |
| 314 | fork crown |
| 315 | fork column |
| 316 | dropout |
| 317 | lower unit (lower) |
| 318 | top unit |

The invention claimed is:

1. A shock device for an at least partially muscle-powered two-wheeled vehicle comprising: a damping system having a damper cylinder and a moving piston disposed therein, which is connected with a piston rod leading out of the damper cylinder, wherein the piston acts on a first damping chamber in the damper cylinder as the piston rod plunges in from a further retracted base position to a farther plunged in position;

wherein the damping system is configured such that as the piston rod plunges in, damping fluid is transferred from the first damping chamber to an auxiliary chamber;

wherein the flow resistance for transferring the damping fluid into the auxiliary chamber is configured travel-dependent and depends on the piston position and wherein the flow resistance is smaller in a first travel distance of the piston including the base position than in at least one second travel distance that is plunged in further; wherein a transition section is provided between the first travel distance and the second travel distance; wherein the auxiliary chamber establishes an equalizing volume for the volume of the piston rod and wherein the auxiliary chamber is provided with a dividing piston that is biased by a biasing device wherein the position of the dividing piston is dependent on the piston position; at least one first and one second duct lead into the auxiliary chamber to feed damping fluid into the auxiliary chamber; and the second duct is at least partially closed by the dividing piston when the piston is located in the transition section.

2. The shock device according to claim 1, wherein the first travel distance extends over a length that is shorter than 60% or ½ or 40% of the maximum piston stroke.

3. The shock device according to claim 1, wherein the flow resistance remains substantially unchanged in the first travel distance.

4. The shock device according to claim 1, wherein the flow resistance is influenced by changing the effective flow cross-section.

5. The shock device according to claim 1, wherein the flow resistance is influenced by changing the length of the flow path.

6. The shock device according to claim 1, wherein the flow resistance is influenced by changing the passage resistance of a flow valve.

7. The shock device according to claim 6, wherein the first travel distance is followed by a transition section in which the flow cross-section is reduced.

8. The shock device according to claim 7, wherein the transition section is shorter than 25% or 20% of the maximum piston stroke.

9. The shock device according to claim 1, wherein the second travel distance follows the transition section and extends over a length between 40% and 60% of the maximum piston stroke.

10. The shock device according to claim 1, wherein the piston variably divides the damping volume in the damper cylinder into a first damping chamber and a second damping chamber.

11. The shock device according to claim 1, wherein the piston is equipped with at least one throttle unit.

12. The shock device according to claim 1, wherein the second duct is substantially closed when the piston is located in a second travel distance following the transition section, wherein the first travel distance and the transition section extend over less than half of the piston stroke.

13. The shock device according to claim 1, wherein the first duct and the second duct are flow ducts of a throttle for the compression stage.

14. The shock device according to claim 13, wherein the flow resistance of the throttle for the compression stage is adjustable from outside by way of at least one operating member.

15. The shock device according to claim 1, wherein the transition position of the transition section is adjustable.

16. The shock device according to claim 1, wherein the length of the transition section is adjustable.

17. The shock device according to claim 1, wherein an additional throttle for the high-speed compression stage is provided.

18. The shock device according to claim 1, wherein the dividing piston is biased by means of a steel spring and/or a gas spring.

19. The shock device according to claim 1, wherein a device for stronger top-out damping is provided.

20. The shock device according to claim 1, wherein the base position is an initial position with the piston rod extended to its maximum, or the sag position.

21. The shock device according to claim 1, comprising at least one tube system including a stanchion tube and a cooperating slider tube and an adjacent wheel receiving space, wherein the damping system is disposed in the tube system.

22. The shock device according to claim 1, comprising an accommodation for a saddle device or being configured as a rear wheel damper or a suspension fork.

* * * * *